Patented Feb. 27, 1923.

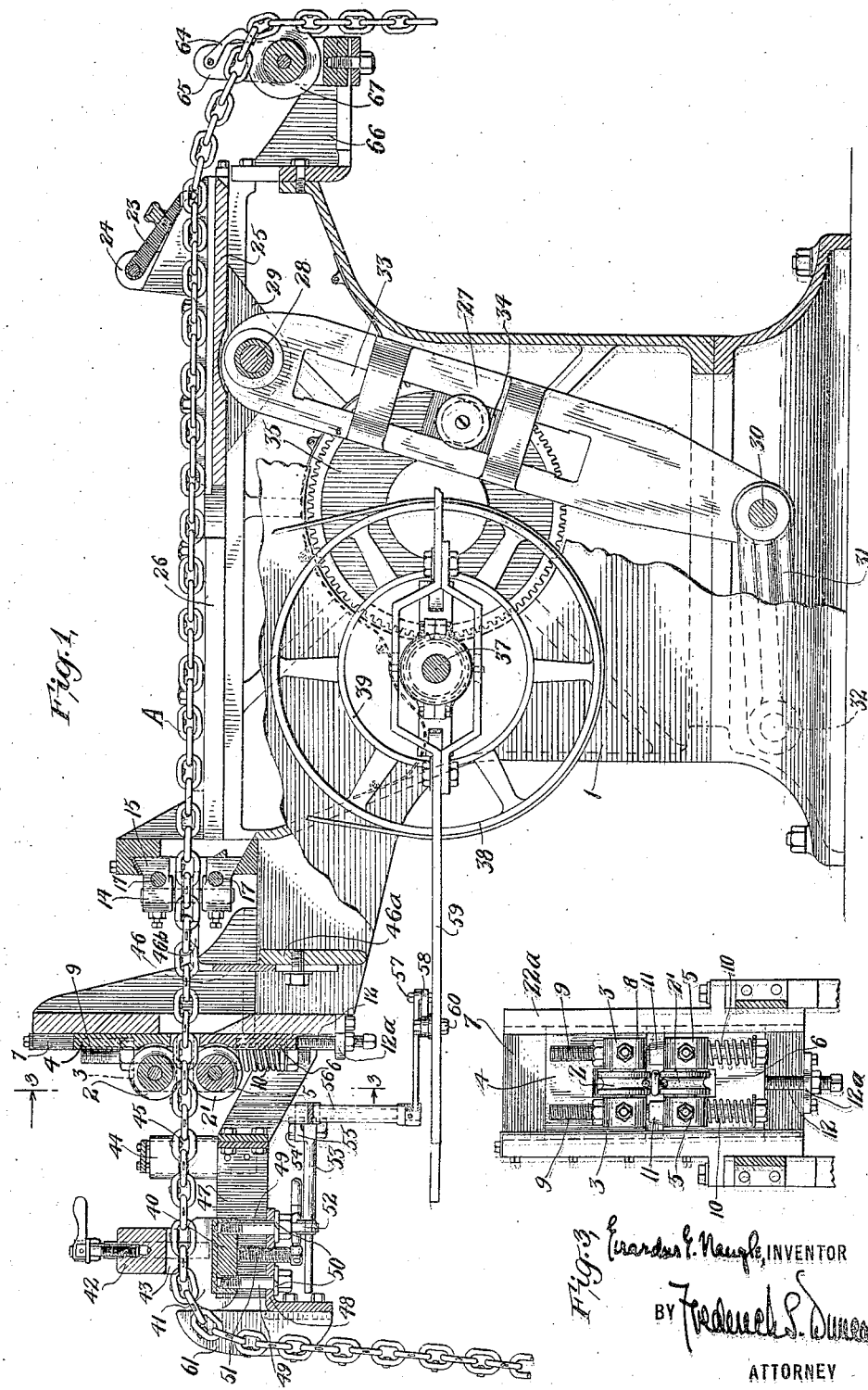

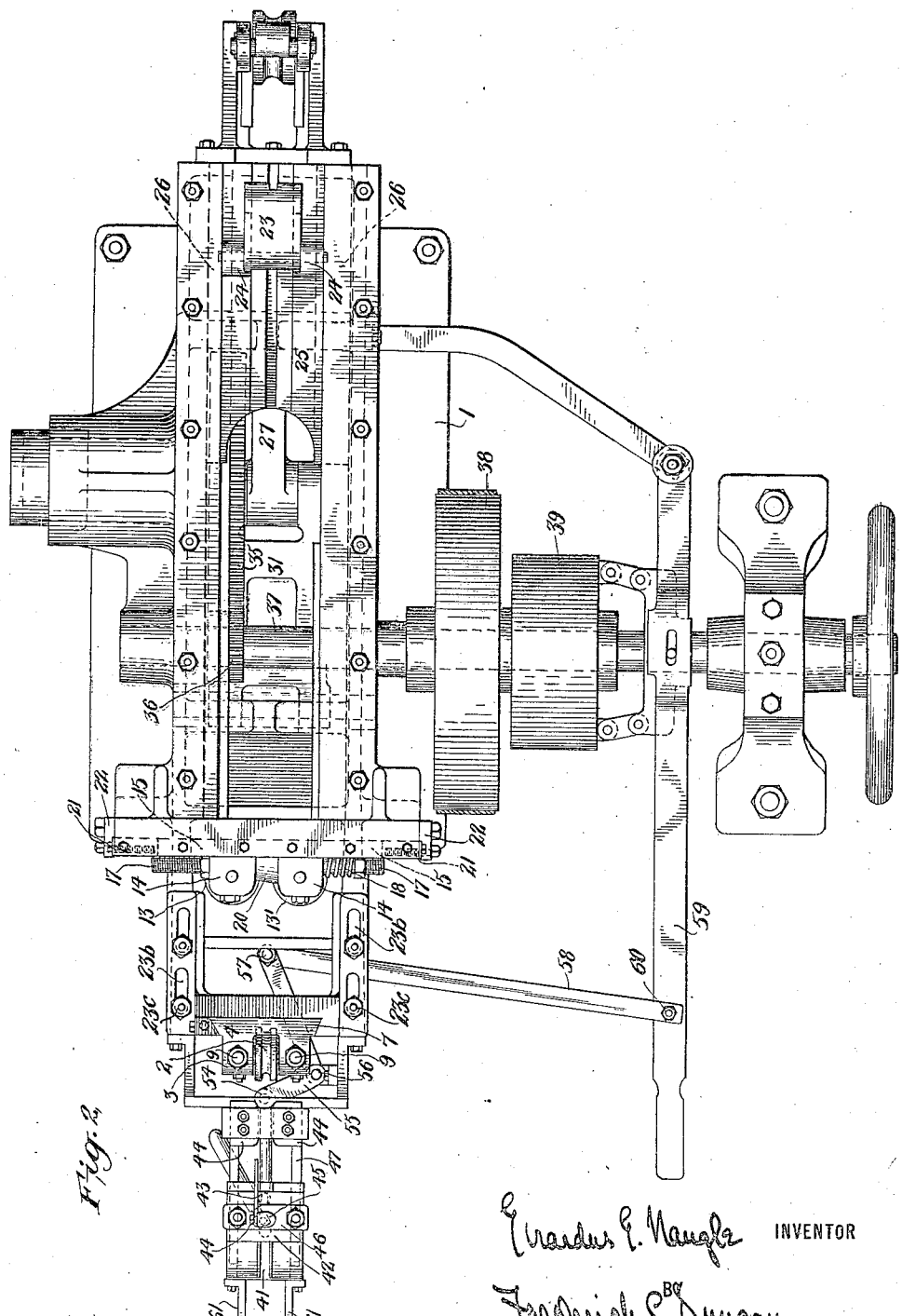

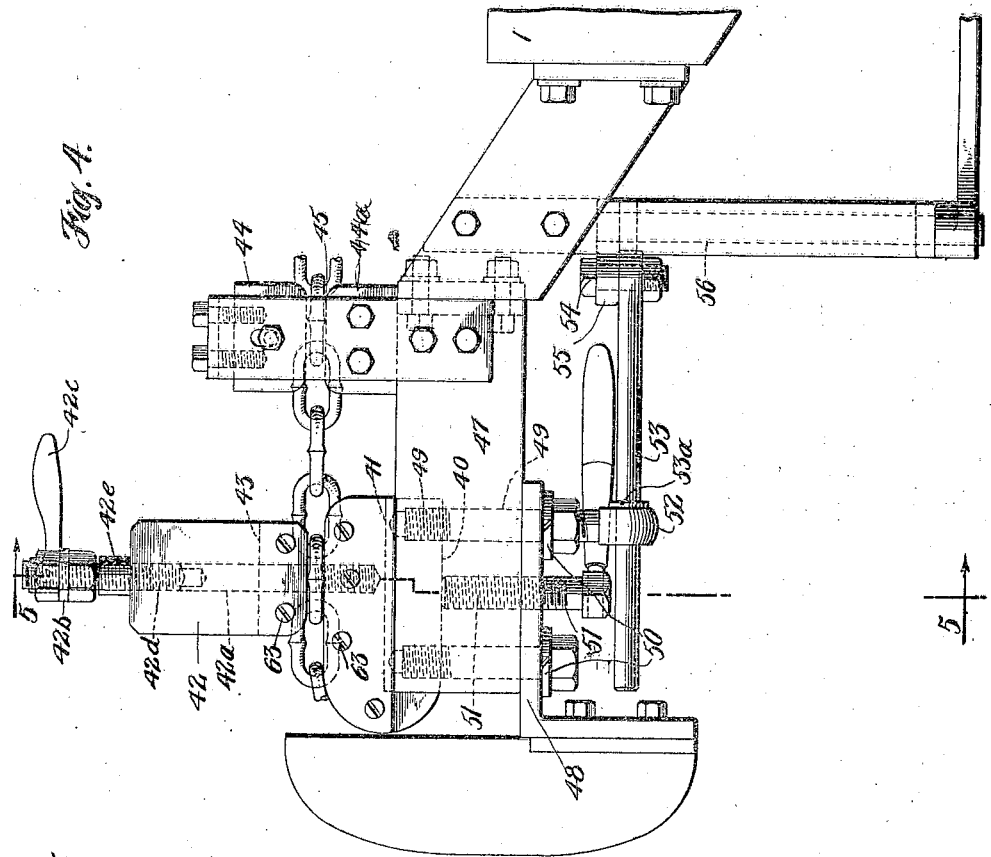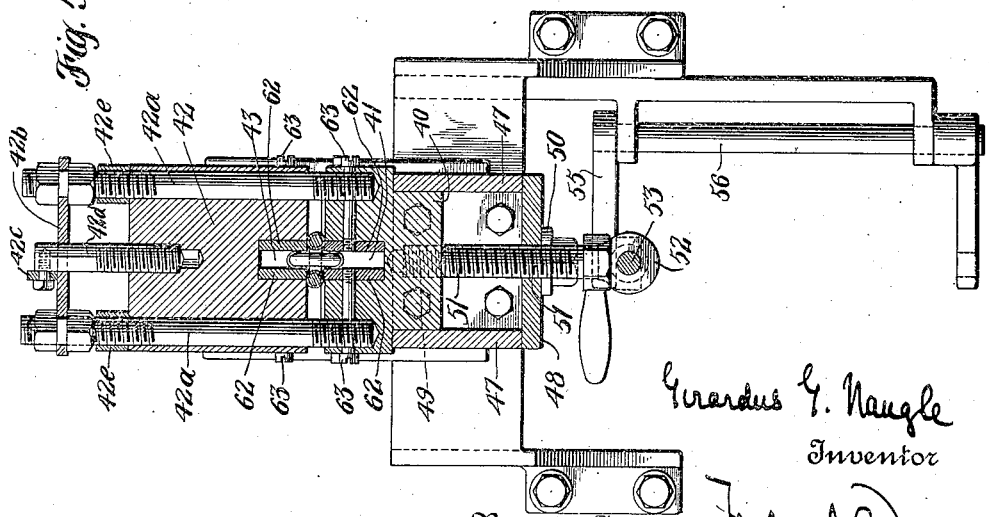

1,446,923

UNITED STATES PATENT OFFICE.

GIRARDUS G. NAUGLE, OF YORK, PENNSYLVANIA, ASSIGNOR TO AMERICAN CHAIN COMPANY, INC., A CORPORATION OF NEW YORK.

MACHINE FOR SMOOTHING CHAINS.

Application filed April 26, 1921. Serial No. 464,711.

*To all whom it may concern:*

Be it known that I, GIRARDUS G. NAUGLE, a citizen of the United States, residing at York, in the State of Pennsylvania, United States of America, have invented certain new and useful Improvements in Machines for Smoothing Chain, of which the following, taken in connection with the accompanying drawings, is a specification.

My invention relates to machines for reducing or smoothing down projections, protuberances and rough areas on the surfaces of chain links, more particularly the fins or burs which are frequently left as the result of the application of electric welding processes to the manufacture of chain. In the manufacture of electric welded chain, it is customary to swage the joint which results from the action of the current, and this swaging process is often carried out in such manner as to leave a roughness of surface and frequently fins which are due to imperfect work, and especially to the exuding of the molten or plastic metal from between the welded ends. While the fins mentioned are perhaps the most objectionable of the characteristics which I purpose to eliminate, nevertheless, it will be obvious that my machine is equally adaptable for the removal or reduction of rough areas or projections of any character.

Functionally considered, the machine operates by causing the chain to be drawn through a plurality of passes each preferably formed by cooperating rolls of appropriate shape, and means are provided for maintaining the chain at a considerable degree of tension while this operation is going on, in order that there may be no kinking or uneven motion of the chain through the passes; and means are also preferably provided for relieving the tension, and if desired, stopping the machine in case the tension exceeds a predetermined quantity.

One object of my invention is the construction of a machine for the above described purposes which will operate with rapidity and facility on chain of the larger sizes, say one-fourth inch stock and over. It will nevertheless be obvious that the machine may be easily adapted to operate on chain of any size, although as other effective means are commonly used for smoothing chain of the smaller sizes, I have thought it best to emphasize the special utility of my machine for operating in chain of the larger sizes.

Another object is the construction of a machine for the above described purpose that will involve a continuous motion of a length of chain as distinguished from the several well known methods wherein the chain is stopped at intervals of one link or alternate links for the operation of reducing the bur or fin.

Another object is the construction of a machine of the character above described and provided with passes through which the chain is drawn, in which means are provided for maintaining the chain under sufficient tension to prevent its kinking and to facilitate an even travel through the passes.

Another object is to provide a machine for the above described purposes whereby the fins or other projections on welded chain may be rolled down as distinguished from other methods, such as swaging, cutting, or abrading.

Another object is to provide a machine for the above described purpose whereby the operations mentioned may be carried on while the chain is at normal temperature.

Another object is the construction of a machine for the purpose described and involving the use of passes through which the chain is drawn under tension, in which provision is made for preventing the tension from exceeding a certain quantity and also, if desired, stopping the machine in case the tension exceeds the said quantity.

Another object is the construction of a machine of the character described in which shall be incorporated a powerful and rapid feeding mechanism.

While I have shown and described my machine in a form adapted for operating on the well known type of chain composed of open elongated links having substantially parallel side strands, and in which the plane of each link is at an angle of 90° with respect to the plane of the preceding and following links, it will become obvious, upon inspection of the drawings and reading of this description, that with suitable changes that can be made by any person ordinarily skilled in the art, the machine may be readily adapted for use in connection with chain of other types.

Referring to the drawings:

Figure 1 is a side elevation of the machine partly in longitudinal section and with the frame partly broken away in order to clearly show the feeding mechanism.

Figure 2 is a plan view of the machine.

Figure 3 is a sectional view on the line 3—3 of Figure 1.

Figure 4 is an enlarged detail view of the tensioning mechanism.

Figure 5 is a sectional view on the line 5—5 of Figure 4.

In the drawings which show an illustrative embodiment of my invention, the operating parts are shown supported by a frame or table 1. The passes, of which two are shown, are each formed of a pair of oppositely disposed cooperating rolls, one pair of rolls being mounted to rotate in a vertical plane and the other pair in a horizontal plane, this arrangement being an adaptation of the invention to operation in connection with the particular type of chain above described and which is indicated in the drawings by the letter A. The horizontal rolls are indicated by the numerals 2 and 2′, and the upper roll 2 is mounted in bearings 3, 3 which are carried by the slide 4. The lower roll 2′ is mounted in the bearings 5, 5 which in turn are mounted on the slide 6, the slides 4 and 6 being mounted in the slideway 7, whereby they may be moved up or down as a unit as occasion requires to adjust the pass 8 to various positions vertically. As the links of commercial chain, particularly of the larger sizes, ordinarily vary appreciably from one another in their dimensions, it is not ordinarily desirable that the distance between the rolls should be invariable from link to link. On the contrary, I prefer that the passes should be capable of a sufficient degree of expansion and contraction to accommodate links of varying dimensions, which result may be accomplished by connecting the two sets of bearings 3, 3 and 5, 5 by means of the bolts 9, 9 which resiliently unite the two slides 4 and 6, the resiliency being brought about by the expansion springs 10, 10, which surround the shanks of the bolts. In case it is desired to fix a limit of approach of the slides and consequently the rolls toward each other, the collars 11, on the bolts 9, 9 may be interposed between the bearings.

To adjust the pass vertically, the entire combination of slides, rolls, tensioning bolts and mountings may be moved up and down in the slideway 7 by means of the set screw 12 threaded in the projecting bracket 12ª, and abutting against the slide 6 as shown.

The second set of rolls may be constructed substantially like the first, except for such changes as are necessary to adapt them for rotation and adjustment in a horizontal plane. These rolls, which are indicated by the numerals 13 and 13′, may be mounted in bearings 14 carried by separate slides 15, 15, which operate in the horizontal slideway 16, the entire construction thus far described being essentially similar to the construction of the vertical rolls and supporting mechanism. Similarly as in the case of the vertical rolls and their supporting mechanism these rolls may be maintained under tension by means of the bolts 17, 17 which unite the slides and cause them to approach each other under high tension by means of the springs 18, 18 (of which one only is shown) a limit of approach being fixed if desired by the collars 20, 20 (of which one only is shown) mounted on the bolts 17, 17 between the roller bearings. The entire combination last described may be adjusted horizontally by means of the opposing set screws 21, 21 threaded through end plates 22, 22 on the slideway and abutting against the slides 15, 15.

It is desirable that the motion of the chain through the passes be as even as possible and I therefore prefer to make the first described pass adjustable longitudinally of the machine. This may be done by forming the slideway 7 in a bracket 22ª the bracket in turn being adjustably mounted on the frame 1 by means of the slots 23ᵇ and the clamp screws 23ᶜ. The value of adjustability of the pass longitudinally of the machine lies in the fact that the machine may thus be made more easily to operate on chains of varying pitch. For the sake of evenness of motion of the chain through the passes it is desirable that as nearly as possible one or the other of the passes should be working at all times. Therefore with the construction above described, the distance between the passes can be so regulated as desired that while one pass is operating on a link the other is idling and vice versa.

A suitable means are provided for feeding the chain which consists of a pawl 23 suitably formed to grab the chain as shown, and mechanism for causing it to reciprocate longitudinally of the chain. The pawl may be carried by a bracket 24, mounted on the carriage 25, which is adapted for travel in slideways 26, 26. An especially powerful mechanism for causing the reciprocating motion of the pawl may consist of a lever 27, pivoted at 28 to a bracket 29 depending from the carriage, and also at 30 to a link 31 which, in turn, is pivoted at 32 to the frame. The lever 27 is provided with a slot 33 which cooperates with a slide block 34 eccentrically pivoted on the gear 35. The gear 35 is rotatably mounted on the frame and is caused to rotate by any suitable means such as pinion 36, carried by the shaft 37. The shaft 37 carries a conventional clutch arrangement consisting of the loose pulley 38 and the spline clutch member 39, and power may be transmitted to the machine through the pulley 38 from any suitable source.

To maintain the chain under a suitable degree of tension and to limit the size of the links and the dimensions of the burs or other projections and rough areas which will be permitted to reach the guides hereinafter described, and thence the passes, and also to prevent the chain from reaching the guides in kinked condition, I provide the block 40 having the groove 41 and also the block 42 having the groove 43, the blocks being so positioned and spaced with respect to each other as to form a cruciform die through which the chain may be drawn without the possibility of twisting. The block 42 is supported by the bolts or standards 42$^a$—42$^a$ on which it is capable of sliding to a small extent in a vertical direction, being normally pressed against the chain A and by gravity. A crosshead 42$^b$ is supported by the standards and a cam lever 42$^c$ pivoted on the stud 42$^d$ projecting from the block 42 and through the crosshead may be used to raise the block from the chain when desired. As stated, the vertical motion of the block 42 is limited, the limit being created by the collars 42$^e$, 42$^e$ surrounding the bolts or standards 42$^a$, 42$^a$. By thus limiting the upward motion of the block 42 a limit is established to the size of the horizontal links and to the dimensions of projections and burs on horizontal links which will pass through the cruciform die.

A guide for preventing the chain from twisting and consisting of two pairs of blocks 44, 44, and 44$^a$, 44$^a$ respectively positioned one pair above the other and with the parts of each pair slightly separated to form the cruciform guide 45 may be provided, this guide serving not to create tension but to insure suitable alignment of the chain as it enters the first pass, and to perform this function is preferably placed in close proximity to the pass. Also if desired, another guide for keeping the chain in alignment as it approaches the pass formed by the vertical rolls may consist of the bifurcated plate 46 fastened to a portion 46$^a$ of the frame and formed into a horizontal slot 46$^b$. The vertical links enter the slot and the horizontal links travel on the surface and as this guide leads nearly to the pass, the chain is thus guided accurately into it.

On account of possible irregularities in the dimensions of various links, irregularities of such proportions as would cause the chain to bind in the tension device above described, I prefer to set the tensioning mechanism so that a link having dimensions of its own or projections having dimensions exceeding a predetermined quantity will be unable to pass through the cruciform die in the tension device, and I prefer further to construct the tension device in such manner that, upon a predetermined tension being exceeded, the tensioning device will yield, and if desired, cause the power to be shut off or the chain feeding mechanism otherwise stopped. This result may be accomplished by mounting the block 40 on a slideway 47 and yieldingly clamping it on the slideway. The clamping may be accomplished by means of the bolts 49, 49 and the plate 48, the bolts passing through the plate and being threaded in the block as shown, whereby a frictional engagement between the tensioning device and the slideway is established. To make this frictional engagement yieldable, spring washers 50, 50 may be interposed between the heads of the bolts 49, 49 and the plate 48. To oppose the tension between the block 40 and the plate 48 so that the frictional engagement may be released and the tensioning device be moved freely by hand along the slideway 47, it is desirable to incorporate the set screw 51 threaded in the plate 48 and abutting against the block 40. It will thus be seen that if the tension of the chain at any time for any reason exceeds the measure of frictional engagement between the tensioning mechanism and the slideway 47, the entire tensioning device will be drawn along the slideway. I prefer, however, that any such travel of the tensioning device as is last described should at the same time cause the power to be shut off or the motion of the mechanism otherwise stopped. I therefore make use of any such possible travel to operate the clutch lever. This may be accomplished by any suitable means, but in my particular form illustrated, I show a bolt 52 projecting downwardly from the plate 48 and provided with an eye through which the rod 53 may slidingly pass. The rod 53 is provided with a shoulder as shown which limits the extent to which it may pass through the eye of the bolt, and is also pivotally connected at 54 with one arm 55 of a bell crank lever pivoted to the frame of the machine at 56. The other arm of the bell crank lever is pivotally connected at 57 with the link 58 which in turn is pivotally connected to the clutch lever 59 at 60. The clutch shown is of a well known conventional type and it is obvious that as the block 40 and plate 48 travel along the guide rail 47 and the eye of the bolt 52 strikes the shoulder 53$^a$, the clutch will be thrown out and the machine will stop. On the other hand, the construction of the rod 53 offers no obstruction to the free operation of the clutch mechanism by hand in the usual manner when the block 40 is at the extreme of the guide rail as shown in Figure 1. If desired, side plates 61 are provided for properly guiding the chain into the tensioning device. To take care of various sizes of chain the die in the tensioning device may be lined with hardened steel plates 62 retained by screws 63 for adjustment to accommodate various thicknesses of material used in making chain.

To obviate any possibility of the chain being drawn backwardly on the return movement of the carriage, I provide a pawl 64 carried by the support 65 which in turn is mounted on the bracket 66 projecting from the frame. The chain may, if desired, run over a loose grooved pulley 67 as it is fed, thus insuring an even delivery.

The operation of the machine is as follows: The parts being stationary and the block 42 being raised to its upward limit by means of the cam lever 42°, the chain to be smoothed is passed through the tensioning device, and thence through the guides and passes, whence it is drawn to cause it to engage with the pawl 23. If necessary, the tension of the pass rolls may be temporarily relieved to facilitate the drawing of the chain therethrough by relieving spring tension of springs 10 and 18. The power is then connected by operating the hand lever 59 in the usual manner, whereupon the reciprocatory motion of the pawl 23 is begun and continued, and as the chain is thereby drawn through the passes projections, fins and rough areas of the character above described are smoothed down. While the chain is thus being drawn through the passes the frictional engagement of the block 40 with the slideway 47 is maintained at a sufficient quantity to resist the normal tension of the chain. On the other hand, the extent of this frictional engagement is limited to such an extent that in case a link exceeding given dimensions or having projections or fins exceeding given dimensions attempts to pass through the tensioning device, the frictional engagement of the latter with the slideway will give way and the tensioning device will be drawn along the slideway. As the tensioning device is drawn along the slideway the bolt 52 strikes the shoulder 53ª and thence, through the bell crank lever above described and the link 58, operates the clutch to shut off the power, thus stopping the feeding mechanism. Thereupon the block 42 may be again raised and the pawl may be withdrawn from engagement and the chain withdrawn to a sufficient distance to make it possible to easily remove or repair the objectionable link or otherwise remedy the difficulty.

While I have illustrated and described but a single embodiment of the invention, it would be apparent to those skilled in the art that various changes and modifications may be made therein without departing from the spirit of the invention or the scope of the appended claims.

Having thus described my invention, what I claim is:

1. In a machine for smoothing chain, a chain tensioning device and means for retaining said device in fixed position until the tension thereon exceeds a predetermined quantity.

2. In a machine for smoothing chain, a tensioning device, a slideway on which said device is mounted, and yieldable clamping means for retaining said device in frictional engagement with said slideway.

3. In a machine for smoothing chain, a tensioning device, a slideway on which said device is mounted, and clamping means for retaining said device in frictional engagement with said slideway.

4. In a machine for smoothing chain, a tensioning device adapted to place a chain under substantially uniform tension, said device including two relatively movable members adapted to yieldingly close on said chain, said device also having yieldable frictional engagement with a slideway, and means for regulating the extent of said frictional engagement.

5. In a machine for smoothing chain, a roll pass, means for drawing a chain through said pass, a tensioning device located in advance of said pass, means adapted to permit the said tensioning device to move in the direction of said tension when the said tension exceeds a predetrmined quantity.

6. In a machine for smoothing chain, a normally stationary chain tensioning device, and means adapted to permit said device to move from its position in the direction of tension exerted on a chain subjected to the action of said tensioning device when the said tension exceeds a predetermined quantity.

7. In a machine for smoothing chain, a tensioning device having frictional engagement with a slideway whereby the device is adapted to be drawn along said slideway when the tension exerted on a chain passing through said tensioning device exceeds a predetermined quantity.

8. In a machine for smoothing chain, a chain tensioning device, means for retaining said device in fixed position until the tension thereon exceeds a predetermined quantity, feeding mechanism for said chain, means for connecting and disconnecting power for said feeding mechanism and connections between said tensioning device and said last mentioned means, whereby the said last mentioned means are operated to disconnect the said power when the said tensioning device is caused to move from its fixed position in the direction of said tension.

9. In a machine for smoothing chain, a tensioning device, a slideway on which said device is mounted, yieldable clamping means for retaining said device in frictional engagement with said slideway, a chain feeding mechanism, a clutch for connecting or disconnecting power for said feeding mechanism and lever connections between said tensioning device and said clutch, said lever connections being adapted to transmit to said clutch, motion on said tensioning device on said slideway.

10. In a machine for smoothing chain, a tensioning device, a slideway on which said device is mounted, clamping means for retaining said device in frictional engagement with said slideway, a chain feeding mechanism, a source of power and means operated by said tensioning device when the tension thereon overcomes said frictional engagement for disconnecting the said source of power.

11. In a machine for smoothing chain, a tensioning device adapted to place a chain under substantially uniform tension, said device including two relatively movable members adapted to yieldingly close on said chain and said device also having yieldable frictional engagement with the slideway, means for regulating the extent of said frictional engagement, a roll pass adapted for smoothing the surface of said chain when the same is drawn therethrough, mechanism for drawing a chain through said pass, means for imparting motion to said mechanism, a source of power for operating said means and connections between said tensioning device and said source of power for disconnecting the said source of power when the said tensioning device is caused to move on said slideway in the direction of the said tension.

12. In a machine for smoothing chain, a roll pass, means for drawing a chain through said pass, a tensioning device located in advance of said pass, means adapted to permit the said tensioning device to move in the direction of said tension only when the said tension exceeds a predetermined quantity, and means adapted to be operated by motion of said tensioning device in the line of tension to disconnect said machine from a source of power.

13. In a machine for smoothing chain, a normally stationary chain tensioning device, means adapted to permit said device to move from its position in the direction of tension exerted on a chain subjected to the action of said tensioning device when said tension exceeds a predetermined quantity, a chain feeding mechanism, power transmitting means for said chain feeding mechanism, and connections between said tensioning device and said power transmitting means for disconnecting the power from said chain feeding means when the tensioning device is caused to move from its normally stationary position in the direction of the tension exerted thereon.

14. In a machine for smoothing chain, a tensioning device having frictional engagement with a slideway, whereby the device is adapted to be drawn along said slideway when the tension exerted on a chain passing through said tensioning device exceeds a predetermined quantity, a chain feeding mechanism and connections between said tensioning device and said chain feeding mechanism, said connections being adapted to cause the said chain feeding mechanism to stop when the said tensioning device moves on said slideway in the direction of the tension exerted thereon.

15. In a machine for smoothing chain, a plurality of roll passes, chain guides for said roll passes, means for drawing a chain through said guides and passes, said means consisting of a carriage adapted to slide in alignment with said passes and carrying a pawl adapted to engage said chain, a tensioning device adapted for yieldable engagement with said chain and located in advance of said guides and passes, said tensioning device including a cruciform die adapted to limit to predetermined dimensions the size of a link which may pass therethrough and also the size of a projecting or protuberance on a link which may pass therethrough, said tensioning device having yieldable frictional engagement with a slideway, whereby it is adapted to be drawn in the direction of tension exerted thereon when the said tension exceeds a predetermined amount.

16. In a machine for smoothing chain, a plurality of roll passes, chain guides for said roll passes, means for drawing a chain through said guides and passes, said means consisting of a carriage adapted to slide in alignment with said passes and carrying a pawl adapted to engage said chain, a tensioning device adapted for yieldable engagement with said chain and located in advance of said guides and passes, said tensioning device including a cruciform die adapted to limit to predetermined dimensions the size of a link which may pass therethrough and also the size of a projection or protuberance on a link which may pass therethrough, said tensioning device having yieldable frictional engagement with a slideway, whereby it is adapted to be drawn in the direction of tension exerted thereon when the said tension exceeds a predetermined amount, a source of power for said machine, a clutch for throwing the said power on and off, lever connections between said tensioning device and said clutch adapted to operate the said clutch to throw the said power off when the said tensioning device is caused to move in the direction of the tension exerted thereon.

17. In a machine for smoothing chain, a plurality of roll passes, each of said passes being formed by a pair of cooperating rolls, said rolls being yieldably mounted, guides for guiding a chain into said rolls and means for drawing the said chain through said rolls, said means consisting of a yieldably mounted carriage carrying a pawl adapted to engage said chain when the said carriage is moving away from said passes, and means for imparting reciprocatory motion to said carriage.

18. In a machine for smoothing chain, a plurality of roll passes, each of said passes being formed by a pair of cooperating rolls, said rolls being yieldably mounted, guides for guiding a chain into said rolls and means for drawing the said chain through said rolls, said means consisting of a slidably mounted carriage carrying a pawl adapted to engage said chain when the said carriage is moving away from said passes, and means for imparting reciprocatory motion to said carriage, said last mentioned means consisting of a lever, pivotally connected at one end of said carriage and at the other end to one end of a link which in turn is pivotally connected to a fixed portion of the machine, and a crank adapted to operate in a slot in said lever intermediate its ends.

19. In a machine for smoothing chain, a plurality of passes, each of which is formed by a pair of cooperating yieldably mounted rolls, a guide positioned in advance of one of said rolls, the said guide consisting of a cruciform die, mechanism for subjecting to tension a chain drawn through said passes and means for drawing a chain through said mechanism and said passes consisting of a pawl mounted on a slidably mounted carriage and adapted to engage said chain when the said carriage is moving away from said passes, and means for imparting reciprocatory motion to said carriage.

20. A machine for smoothing chain comprising a plurality of passes disposed in sequence, each of said passes consisting of a pair of cooperating rolls, the members of each pair being mounted to slide toward and away from each other, resilient means for forcing the rolls of each pair toward one another, means for positively limiting the approach of the rolls of each pair toward one another, means for drawing a chain through said passes said means including a sliding carriage carrying a pawl adapted to engage said chain, means for imparting reciprocatory motion to said carriage in substantial alignment with said passes, chain guides for said passes, chain tensioning means located in advance of said passes and said guides, said means comprising a pair of complementary die blocks one of which is yieldably forced toward the other whereby a chain passing through the die is yieldably and frictionally gripped, a slideway on which the said tensioning device is yieldably and slidably mounted so that the said die is adapted to travel substantially in alinement with said passes, clamping means for regulating the measure of frictional engagement of said device with said slideway whereby the same is adapted to remain stationary on said slideway until a predetermined tension on a chain passing through said tensioning device is exceeded, a power transmission clutch adapted to be thrown into and out of engagement at will, and lever connections between said tensioning device and said clutch adapted to transmit to said clutch any motion of said tensioning device along said slideway whereby the said clutch may be thrown out of engagement when such travel takes place.

In testimony whereof, I have signed this specification.

GIRARDUS G. NAUGLE.